(12) United States Patent
Kähkönen

(10) Patent No.: US 10,532,893 B2
(45) Date of Patent: Jan. 14, 2020

(54) DEVICE AND METHOD OF HANDLING STONE SAMPLES

(71) Applicant: Nurmeksen Tyosto ja Tarvike Oy, Nurmes (FI)

(72) Inventor: Mika Kähkönen, Nurmes (FI)

(73) Assignee: Nurmeksen Työstö ja Tarvike Oy, Nurmes (FI)

( * ) Notice: Subject to any disclaimer, the term of this patent is extended or adjusted under 35 U.S.C. 154(b) by 0 days.

(21) Appl. No.: 15/447,663

(22) Filed: Mar. 2, 2017

(65) Prior Publication Data
US 2017/0253437 A1    Sep. 7, 2017

(30) Foreign Application Priority Data
Mar. 4, 2016   (FI) ..................................... 20165183

(51) Int. Cl.
*B65G 47/24* (2006.01)
*B65G 47/248* (2006.01)

(52) U.S. Cl.
CPC .................. *B65G 47/248* (2013.01)

(58) Field of Classification Search
CPC ..... B65G 47/248; B65G 47/244; E21B 25/00; B28D 7/04; B28D 1/04; B28D 1/12; B28D 1/041; B65D 85/20
USPC ......................... 414/758; 206/45.23; 220/529
See application file for complete search history.

(56) References Cited

U.S. PATENT DOCUMENTS

| | | | | |
|---|---|---|---|---|
| 2,671,742 A * | 3/1954 | Cozzoli | ..................... | B08B 9/28 134/170 |
| 3,196,229 A * | 7/1965 | Glass | .................... | E21B 25/005 206/443 |
| 3,272,329 A * | 9/1966 | Mehalov | ................ | B65D 71/02 206/443 |
| 3,581,929 A * | 6/1971 | Guenard | ................ | B65D 21/08 206/443 |
| 5,888,043 A * | 3/1999 | Jatcko | ........................ | B66C 1/66 414/459 |
| 6,540,084 B2 * | 4/2003 | Silvers | ................... | B65D 51/28 206/494 |
| 8,287,224 B2 * | 10/2012 | Carpinelli | ............. | A47L 15/501 414/404 |
| 2007/0157635 A1* | 7/2007 | Ford | ......................... | F25D 3/08 62/62 |
| 2010/0018886 A1* | 1/2010 | Wilson | ................... | E21B 25/005 206/443 |

(Continued)

OTHER PUBLICATIONS

Communication dated Oct. 3, 2016, issued from the Finnish Patent Office in corresponding Application No. 20165183.

*Primary Examiner* — Lynn E Schwenning
(74) *Attorney, Agent, or Firm* — Sughrue Mion, PLLC

(57) ABSTRACT

A device and method of handling stone samples. The device (10) comprises a handling unit (13) rotatable relative to a frame (11) of the device. Inside the handling unit may be arranged a stone sample storage box (18) comprising several parallel stone samples (S). On the storage box may be arranged several intermediate cassettes (24) in an upside down position. The handling unit is turned (T) upside down in order to tip the stone samples from the storage box to the several intermediate cassettes. The intermediate cassettes are removed from the handling unit and the stone samples are tipped to individual sawing cassettes (9).

10 Claims, 4 Drawing Sheets

(56) References Cited

U.S. PATENT DOCUMENTS

2010/0324868 A1* 12/2010 Russell .................. B23K 10/00
  703/1
2016/0059987 A1* 3/2016 Keast .................... E21B 25/005
  206/562

* cited by examiner

DEVICE AND METHOD OF HANDLING STONE SAMPLES

BACKGROUND OF THE INVENTION

The invention relates to a device for handling stone samples which are typically elongated cylindrical stone rods which are to be split sawn in their longitudinal direction.

The invention further relates to a method of handling stone samples.

In the mining industry, there is a need to examine the mineral resources in the soil. The examination can be done by drilling holes in the rock with a sample drill that comprises a holesaw. This way, a sample that is an elongated cylindrical stone rod is detached from the rock. This sample drilling is also called rotary drilling and core drilling, and the rod-like sample is also called a drill core. The sample rod can be sawed across longitudinally so that more of the surface to be examined is revealed. A stone saw can be used to saw the sample. Typically stone saws comprise a vertical circular saw blade, against which the sample rod is fed horizontally by means of a feeding device. However, the rock may be fragmented and loose, whereby the detached stone samples may also be fragmented and may thereby comprise a plurality of smaller stone pieces. Handling of such small stone pieces is difficult and time consuming. Thus, the present procedures for handling the stone samples are found to comprise some disadvantages.

BRIEF DESCRIPTION OF THE INVENTION

It is an object of the present invention to provide a novel and improved device and a method for handling stone samples.

The device of the invention is characterized by features disclosed in an independent apparatus claim.

The method of the invention is characterized by features disclosed in an independent method claim.

An idea of the disclosed solution is that detached stone samples are placed at a sample drilling site to a stone sample storage box for transport and storage. The storage box comprises two or more parallel compartments inside which the stone samples may be arranged. The compartments or stone spaces are open towards an upward direction, whereby the stone samples are visible from above. The stone samples need to be moved from the storage box to several sawing cassettes for preparing the stone samples for longitudinal split sawing. The transfer from the storage box to the individual sawing cassettes is executed by utilizing several intermediate cassettes. Thus, the stone samples are tipped from the storage box on several parallel intermediate cassettes in one go. The stone samples may thereafter be tipped one by one from each of the intermediate cassettes to separate sawing cassettes. The tipping of the stone samples from the storage box may be executed by means of a handling device comprising a handling unit inside which the storage box and the intermediate cassettes may be arranged. The handling unit may be turned upside down together with the handling components inside it in order to execute the tipping and transfer of the stone samples.

An advantage of the disclosed solution is that handling of the stone samples is facilitated and quickened. This is especially the case when the stone samples comprise fragmented stone and several separate stone pieces. The disclosed solution avoids a need to pick up each separate stone piece manually by hand. In the present solution all the pieces are treated in one go. The disclosed solution also ensures that order of the stone pieces is not changed during the handling, since the separate stone pieces are not manipulated separately and possible human errors do not occur and influence to the order of the pieces. Thanks to the use of the turning or handling device, boring and monotonous manual picking work may be removed and work satisfaction may thereby be improved.

According to an embodiment, the device comprises two lids, namely a first lid and a second lid, which are connected to opposite longitudinal sides of the handling unit by means of hinges. Thus, the lids may be opened and closed. Further, the handling unit has two operational positions and may be turned around the turning axis for positioning the handling unit to an initial first operational position and a second operational position. At the first operational position the first lid is closed and its inner surface may serve as a horizontal bottom of the inner space. The second lid may be opened at the first operational position for providing access to the inner space of the handling unit. When the handling unit is turned upside down to the second operational position, the second lid may serve as a horizontal bottom of the inner space and the first lid may be opened allowing access to the inner space. The lids are easy and fast to use and they facilitate easy handling of the storage box and the intermediate cassettes. Further, a basic body of the handling unit may be relatively simple since the lids serve as the bottom plates of the inner space.

According to an embodiment, the device comprises a first lid and a second lid connected to the handling unit. Further, the lids comprise surface plates and at least one edge plate connected transverse to at least one edge of the surface plate. In this embodiment a basic body of the handling unit may be even simpler because of the shaped lid structures.

According to an embodiment, the device comprises a first lid and a second lid connected to the handling unit. Further, the lids have rectangular surface plates and four transverse edge plates surrounding the surface plates.

According to an embodiment, the handling unit comprises one or more locks for locking both lids in their closed positions. The locks ensure that the lids stay closed when the storage box loaded with stone samples is arranged inside the handling unit.

According to an embodiment, width of the inner space of the handling unit is dimensioned in a horizontal direction so that the inner space may receive one single stone sample storage box loaded with several parallel stone samples inside the handling device. The inner space is also dimensioned in a vertical direction so that the several separate intermediate cassettes may be placed above the stone samples. The storage box may comprise 2-6 parallel stone samples and number of the intermediate cassettes corresponds to the number of the parallel stone samples. Thus, the handling device may be used to process simultaneously several stone samples. The handling of the several stone samples is fast and does not cause significant physical loading for an operator.

According to an embodiment, the device comprises a locking system for locking the handling unit to be immovable relative to the frame. Thus, the handling unit is lockable relative to the turning movement at least to two operational positions. The locking system may improve stability of the handling unit and may thereby facilitate the handling process. The locking system may comprise any suitable brake or shape locking means, for example.

According to an embodiment, the frame is provided with wheels or other feasible rolling means. Thereby, the device is a mobile device and may be moved at the sample sawing work site.

According to an embodiment, the intermediate cassette comprises an elongated chute provided with a bottom plate on which the stone sample is supportable. Further, cross section of the bottom plate of the chute widens towards an open upper most part of the bottom plate, whereby the cross section of the bottom plate is curved or is V-shaped so that it resembles letter V. The upper surface of the bottom plate serves as an operational support surface of the cassette.

According to an embodiment, the intermediate cassette comprises an elongated chute and the chute comprises ends which are provided with end pieces thereby preventing the stone samples moving longitudinally out of the intermediate cassette. The end pieces may be transversal end plates. Furthermore, the end plates may extend above an upper most part of the chute and may be provided with openings at their upper parts, whereby the openings are configured to serve as lifting openings through which fingers may pass.

According to an embodiment, the lids of the handling unit have rectangular surface plates comprising two longer sides in the longitudinal direction of the device and two shorter sides in the transverse direction of the device. The second lid on the intermediate cassette side of the handling unit is provided with two opposite edge plates at shorter sides of the rectangular surface plate and outermost edges of the edge plates are shaped in accordance with the shape of the intermediate cassette. Thereby, the outermost surface shapes of the edge plates may match with a bottom shape of the intermediate cassettes.

According to an embodiment, the handling unit comprises locks for locking the lids at their closed positions. The locks may be clamp locks or other suitable quick locking devices.

According to an embodiment, the handling device comprises at least one actuator for turning the handling unit between the first and second operational positions. The actuator may be an electrical motor or a pressure fluid operated motor or cylinder. The actuator operated device is suitable especially for handling storage boxes which are large and heavy.

According to an embodiment, the handling unit comprises at least one handle for directing manual turning force to the handling unit.

According to an embodiment, the handling device is also utilized for handling the stone samples after being split sawn. Then, the stone samples are at first moved by manual tipping from the sawing cassettes back to the intermediate cassettes, and further, are moved from the intermediate cassettes back to the storage box by executing the tipping by means of the handling device. Thus, the handling device may also be utilized for tipping the split sawn stone material.

As it is discussed above, the device and method relates to handling of the stone samples or drill cores in soil testing. Drill cores are cylindrical stone rods that are sawed across in the longitudinal direction with a stone saw or into which one or more longitudinal saw grooves are sawed.

It should also be noted that the above-mentioned embodiments and the related features can also be combined. This way, it is possible to form for each purpose a suitable combination of the features disclosed in this patent application.

BRIEF DESCRIPTION OF THE FIGURES

Some embodiments are explained in more detail in the accompanying drawings, in which.

For the sake of clarity, the figures show some embodiments in a simplified manner. In the figures, like reference numerals identify like elements.

DETAILED DESCRIPTION OF SOME EMBODIMENTS

Figure 1:
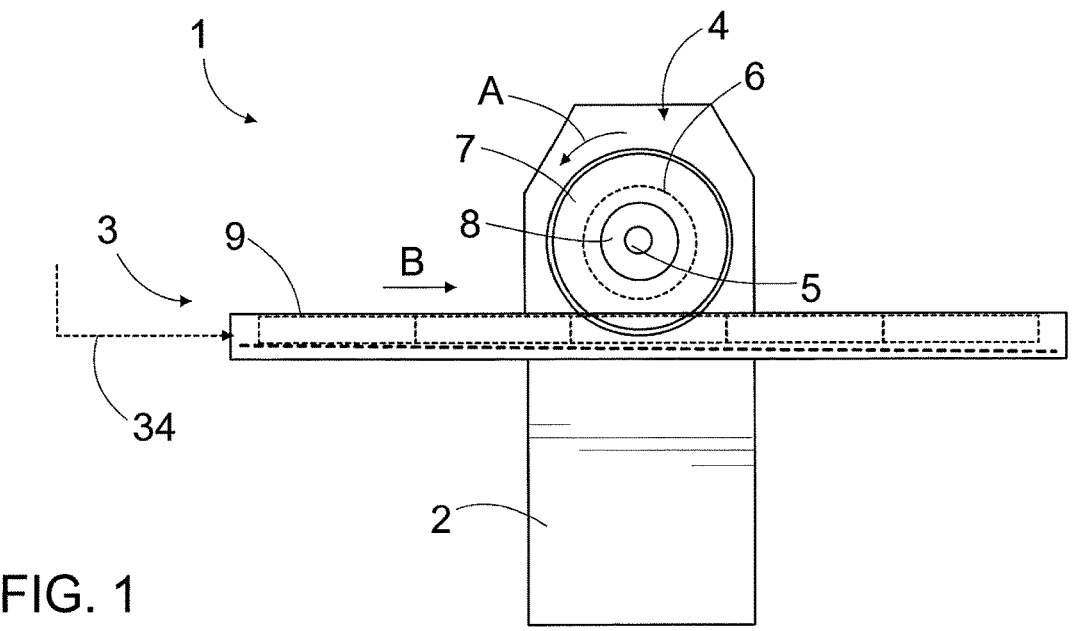
FIG. 1 is a schematic side view of a stone saw.

For the sake of clarity, FIG. 1 shows a highly simplified stone saw 1 that comprises a frame 2, feeding device 3 and sawing device 4. The sawing device 4 comprises a rotation axle 5 that is supported to the frame 2 and can be rotated A by means of a rotation device 6. A circular blade 7 can be fastened to the rotation axle 5 between blade flanges 8. A stone object to be sawed can be fastened to a sawing cassette 9 or a corresponding fastening element that can be fed B toward the rotating circular blade 7 during sawing. There may be several consecutive sawing cassettes 9 and they may be arranged on the feeding device 3 that may comprise a manual conveyance device or it may be equipped with a transfer conveyor, such as a belt conveyor. The stone saw 1 may be a horizontal machine tool, in which the rotation axle 5 and feed B are horizontal.

Figure 2:
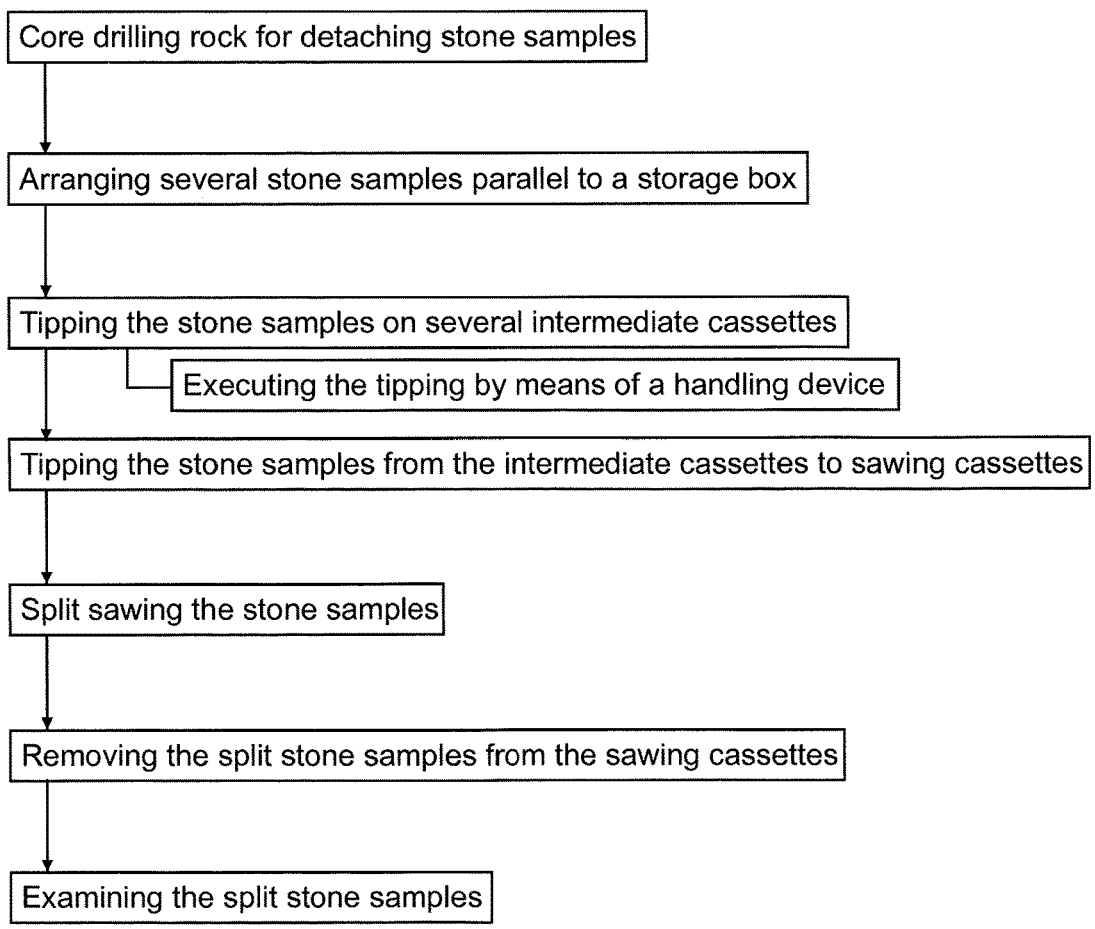
FIG. 2 is a schematic diagram showing process and handling steps of stone samples.

FIG. 2 shows process steps and handling of stone samples. These issues have been disclosed already above in this patent application.

Figure 3:
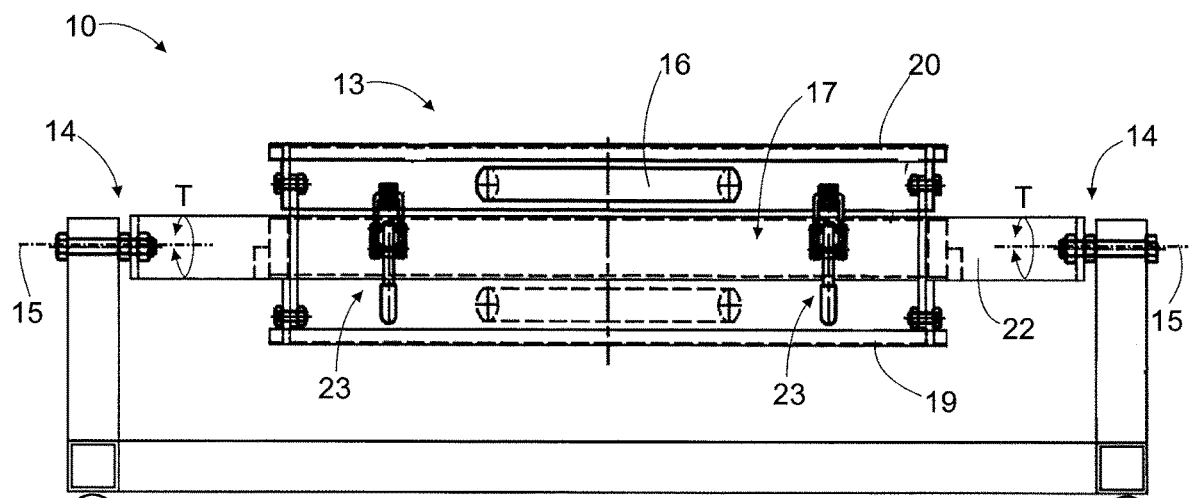
FIG. 3 is a schematic side view of a device intended for handling stone samples.
Figure 4:
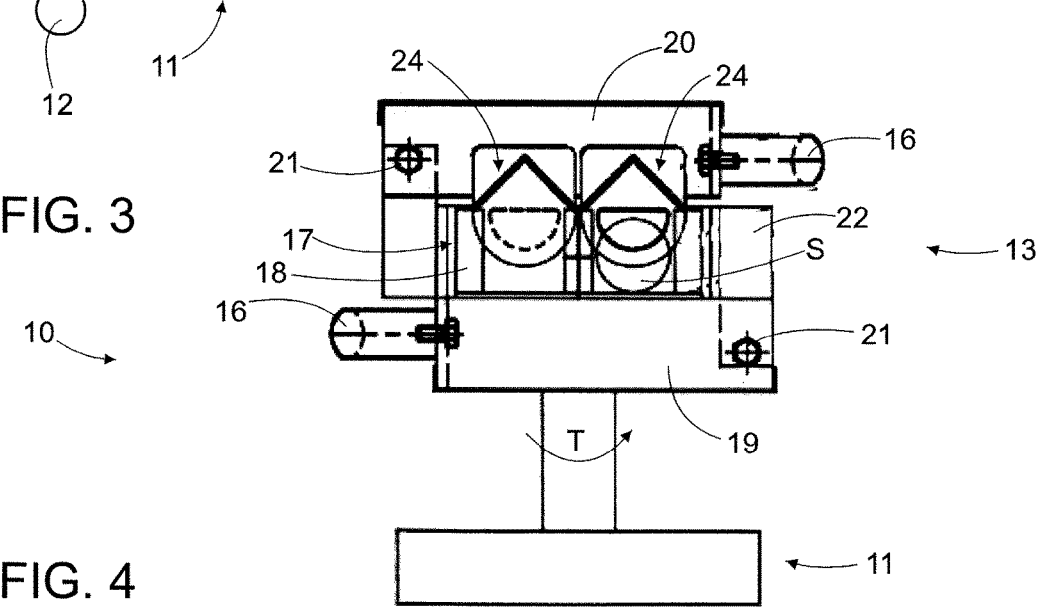
FIG. 4 is a schematic view showing a handling device at an initial first operational position and seen in a longitudinal direction.
Figure 5:
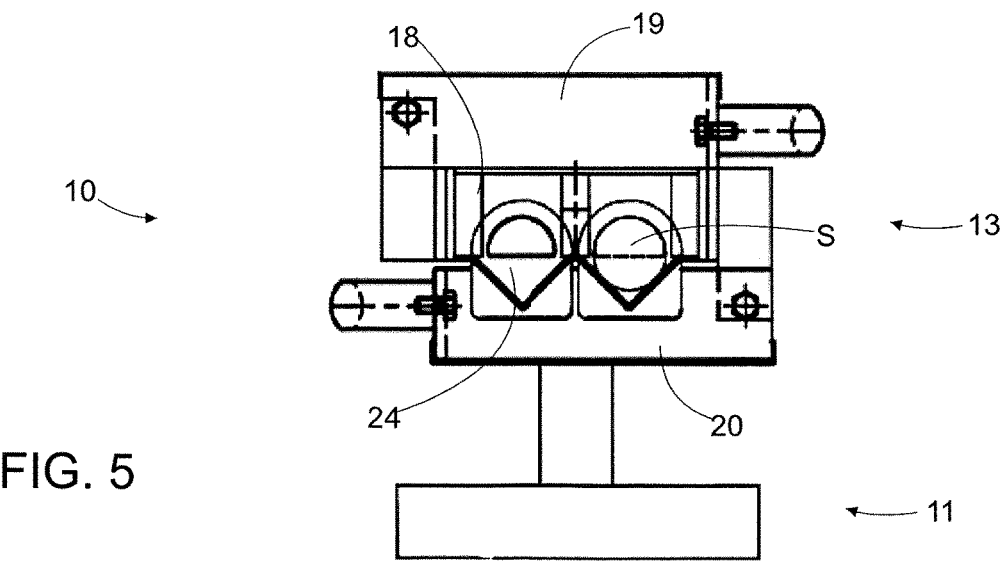
FIG. 5 is a schematic view of the device of FIG. 4 at an operational second position.
Figure 7:
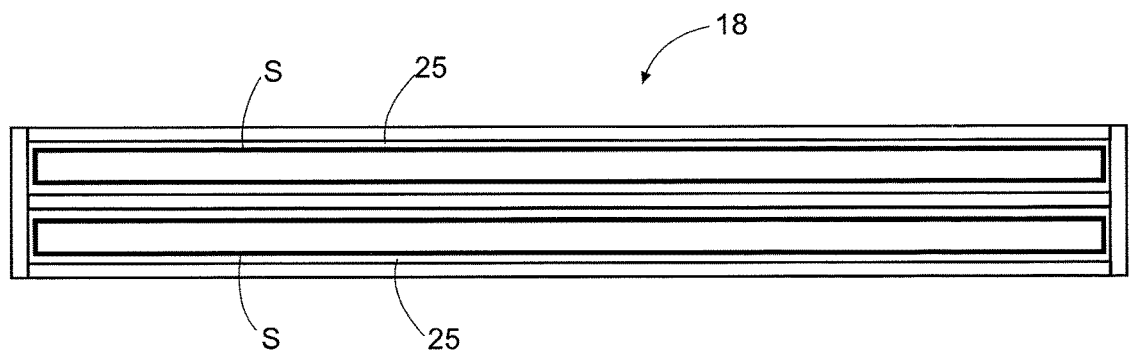
FIGS. 7 and 8 are schematic views of a storage box comprising compartments with parallel stone samples.
Figure 8:
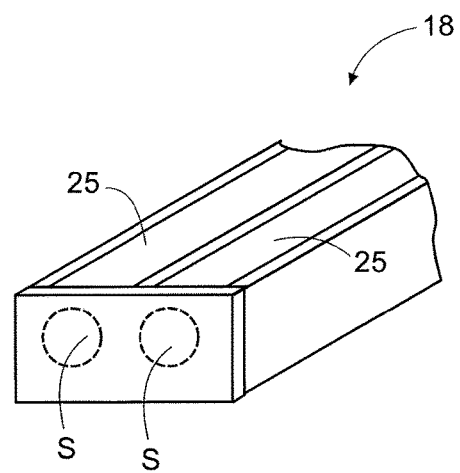

FIG. 3 discloses a device 10 for facilitating handling of stone samples. The device comprises a support frame 11, which may be provided with wheels 12 allowing movements of the frame 11. The device 10 further comprises a handling unit 13, which is supported horizontally to the support frame 11. Between the support frame 11 and the handling unit 13 are horizontal pivot means 14 allowing turning T of the handling unit 13 upside down around turning axis 15 of the pivot means 14. The handling unit may comprise one or more handles 16 for turning T the handling unit 13 manually. Inside the handling unit 13 is an inner space 17 for receiving at least one stone sample storage box loaded with stone samples. The stone sample storage box 18 is shown in FIGS. 7 and 8. The handling unit 13 may also comprise a first lid 19 and a second lid 20, which may both be connected by means of hinges 21 to a body part 22 of the handling unit 13. The hinges 21 are shown in FIGS. 4 and 5. Further, the lids 19, 20 may be locked by means of locking devices 23, which may be clamp locks, for example.

FIG. 4 discloses a handling device 10 in an initial first operational position wherein the first lid 19 is closed and serves as a horizontal bottom of the inner space 17. Then the second lid 20 may be opened for placing the storage box 18 loaded with stone samples S inside the inner space 17. Several intermediate cassettes 24 may also be placed on the stone sample storage box inside the handling device 10. The intermediate cassettes 24 are positioned upside down at the first operational position. Thereafter, the second lid 20 is closed and locked and the handling unit 13 is turned upside down for tipping the stone samples S from the storage box 18 to the intermediate cassettes 24 as it is shown in FIG. 5.

Figure 6:
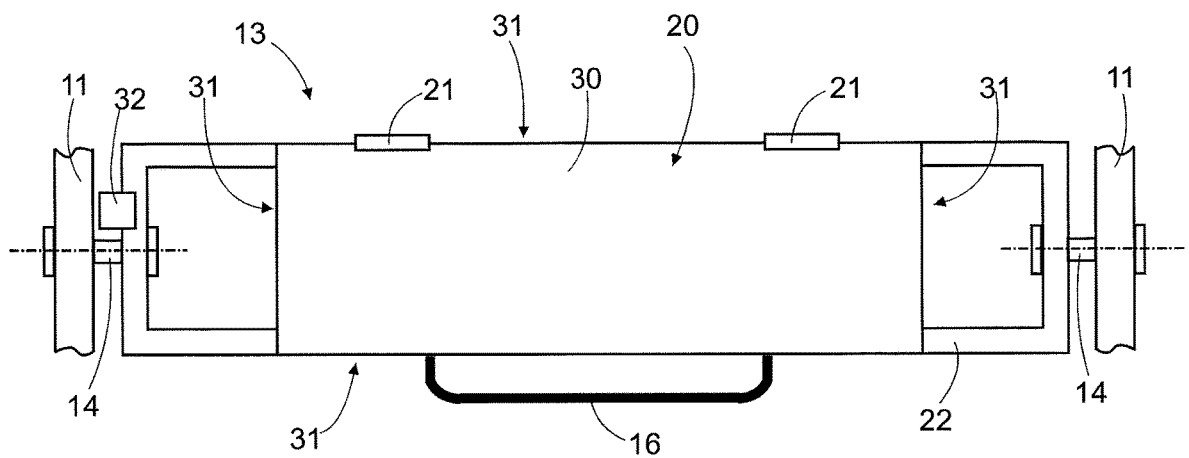
FIG. 6 is a schematic top view of a handling device.

FIG. 6 shows the device 10 seen from above. The lids 19, 20 may comprise rectangular surface plates 30 and four transverse edge plates 31 surrounding the surface plates 30. Furthermore, the device 10 may comprises a locking system 32 for locking the handling unit 13 to be immovable relative to the frame 11. Then the handling unit 13 is lockable relative to the turning movement T at least to two operational positions.

FIGS. 7 and 8 show a stone sample storage box 18 provided with several parallel compartments 25 for receiving stone samples S. In FIGS. 7 and 8 there are two parallel stone samples S, but the number may be greater, such as 3 to 6 parallel stone samples.

Figure 9:
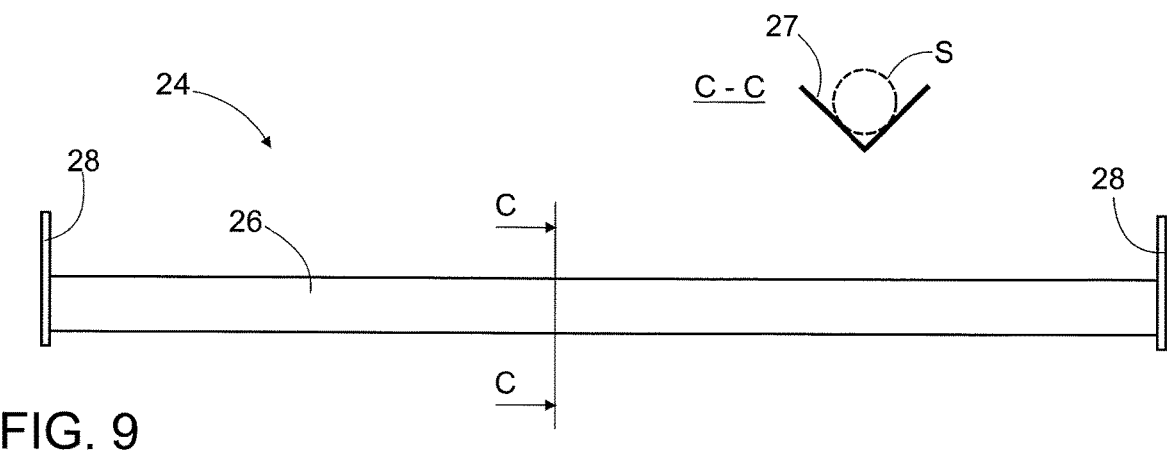
FIG. 9 is a schematic side view of an intermediate cassette.
Figure 10A:
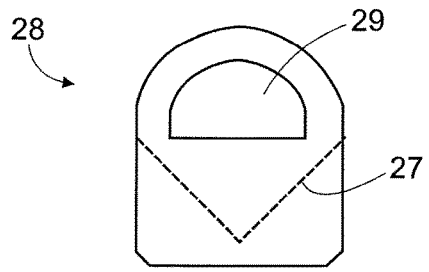
FIGS. 10a and 10b are schematic views of two alternative end pieces of an intermediate cassette.
Figure 10B:
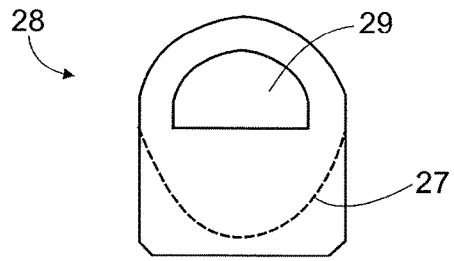
Figure 11:
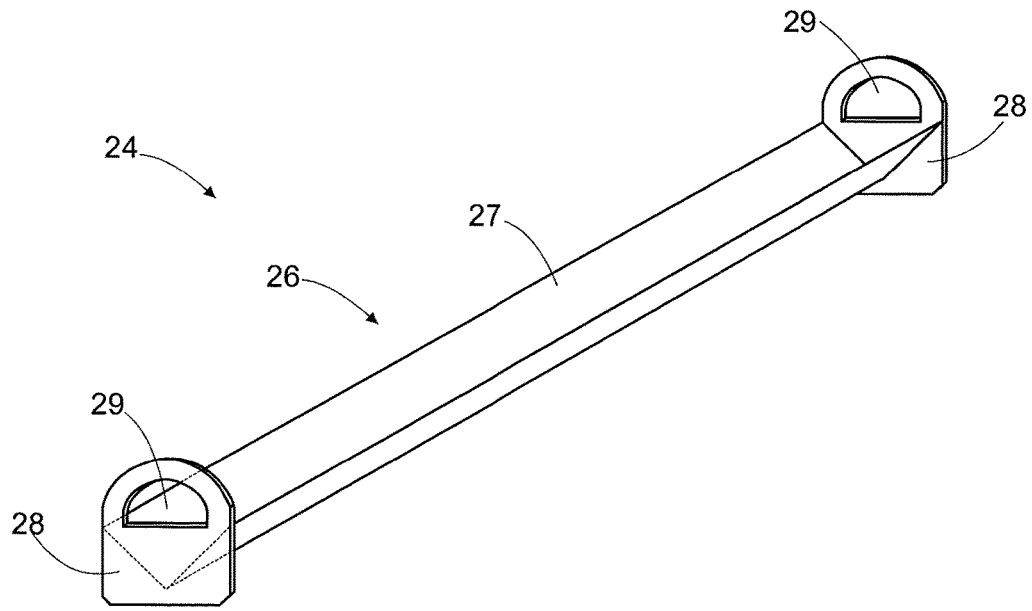
FIG. 11 is a schematic perspective view of an intermediate cassette.

FIG. 9 shows an intermediate cassette 24 comprising an elongated chute 26 provided with a bottom plate 27 on which the stone sample S is supportable. Cross section of the bottom plate 27 of the chute 26 widens towards an open upper most part of the bottom plate 27. The cross section of the bottom plate may be V-shaped as in FIGS. 9 and 10a, or it may be curved as in FIG. 10b. Further, at the end of the chute 26 may be plate-like end pieces 28, which may prevent the stone samples S moving longitudinally out of the intermediate cassette 24. The end plates 28 may extend above an upper most part of the chute 26 and may be provided with openings 29 at their upper parts. The openings 29 may facilitate handling of the intermediate cassettes 24.

The drawings and the related description are only intended to illustrate the idea of the invention. The details of the invention may vary within the scope of the claims.

The invention claimed is:

1. A device for handling stone samples, the device comprising:
    a support frame;
    at least one intermediate cassette, wherein the at least one intermediate cassette comprises a chute having an opening;
    a handling unit supported horizontally to the support frame, the handling unit having at least one inner space, inside the handling unit, configured to receive at least one stone sample storage box loaded with stone samples, and further, the at least one inner space is configured to receive the at least one intermediate cassette on the stone sample storage box; and
    a horizontal pivot between the support frame and the handling unit, the horizontal pivot configured to allow turning of the handling unit upside down around turning axis of the horizontal pivot such that the at least one intermediate cassette and the at least one stone sample storage box are rotated and the stone samples are tipped from the at least one stone sample storage box to the at least one intermediate cassette, wherein
    the at least one intermediate cassette is configured to hold at least one stone sample of the stone samples within the chute while the opening of the chute faces the at least one stone sample storage box, when the at least one intermediate cassette is within the at least one inner space and the stone samples are tipped from the at least one stone sample storage box.

2. The device as claimed in claim 1, wherein
    the device comprises a first lid and a second lid connected to opposite longitudinal sides of the handling unit by means of hinges, whereby the lids are openable and closable;
    and wherein the handling unit has two operational positions when turned around the turning axis, an initial first operational position and a second operational position;
    and wherein at the first operational position the first lid is closed and serves as a horizontal bottom of the inner space and the second lid is openable allowing access to the inner space of the handling unit, and at the second operational position the handling unit is turned upside down whereby the second lid serves as a horizontal bottom of the inner space and the first lid is openable allowing access to the inner space.

3. The device as claimed in claim 1, wherein
    the device comprises a first lid and a second lid connected to the handling unit; and
    the lids comprise surface plates and at least one edge plate fastened transverse to at least one edge of the surface plate.

4. The device as claimed in claim 1, wherein
    the device comprises a first lid and a second lid connected to the handling unit; and
    the lids have rectangular surface plates and four transverse edge plates surrounding the surface plates.

5. The device as claimed in claim 1, wherein
    the device comprises a first lid and a second lid connected to the handling unit, and
    the handling unit comprises locks configured to lock the first lid and the second lid in respective closed positions.

6. The device as claimed in claim 1, wherein
    width of the inner space of the handling unit is dimensioned so that the inner space is configured to receive one single stone sample storage box loaded with several parallel stone samples inside the handling device, and further configured to receive several separate intermediate cassettes, the number of which corresponds to the number of the parallel stone samples.

7. The device as claimed in claim 1, wherein
    the device comprises a locking system configured to lock the handling unit to be immovable relative to the frame, whereby the handling unit is lockable relative to the turning movement at least to two operational positions.

8. The device as claimed in claim 1, wherein
    the frame is provided with wheels whereby the device is a mobile entity.

9. A method of handling stone samples, the method comprising:
    moving several parallel stone samples from a stone sample storage box to several sawing cassettes for preparing the stone samples for longitudinal split sawing, the moving comprising:
        tipping the stone samples from the stone sample storage box onto several parallel intermediate cassettes in one go by rotating the stone sample storage box and the intermediate cassettes; and
        tipping the stone samples from each of the intermediate cassettes individually to the sawing cassettes, wherein
    the intermediate cassettes each comprise a chute with an opening, and each chute is configured to hold, in response to the tipping the stone samples from the stone sample storage box, at least one respective stone sample of the stone samples while each opening of each chute faces the at least one stone sample storage box.

10. The method as claimed in claim 9, further comprising:

utilizing a handling device comprising a handling unit provided with an inner space;

arranging the storage box inside the inner space at an initial first operational position of the handling unit;

arranging the intermediate cassettes on the storage box in an upside down position at the first operational position, whereby operational support surfaces of the intermediate cassettes are facing towards the stone samples arranged inside the storage box having an open top;

turning the handling unit from the initial first operational position upside down to a second operational position relative to a horizontal turning axis of the handling device, whereby at the second operational position the storage box is above the intermediate cassettes and the parallel stone samples are tipped from the storage box against the operational support surfaces of the intermediate cassettes, which intermediate cassettes are beneath the storage box;

removing the storage box from the inner space; and removing the intermediate cassettes from the inner space.

\* \* \* \* \*